Figure 1:
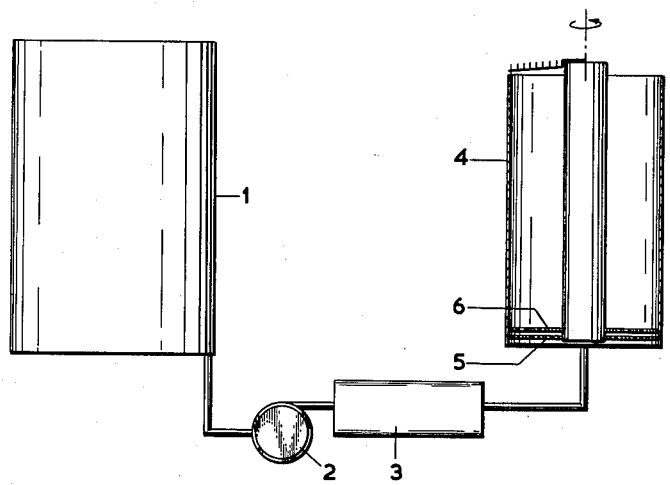
Figure 2:
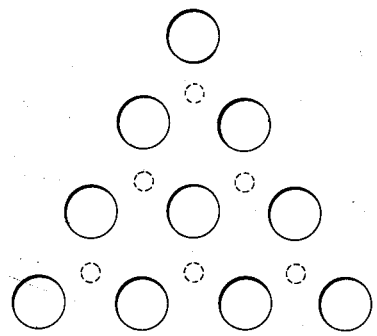

May 5, 1964      L. RADEMA ETAL      3,132,026

PROCESS FOR THE CONTINUOUS MANUFACTURE OF CURD

Filed July 10, 1961      3 Sheets-Sheet 1

*INVENTORS*
LAMBERTUS RADEMA
JACOB UBBELS
BY ADRIAAN G. J. ARENTZEN
JOHAN T. VAN DER LINDE

*ATTORNEYS*

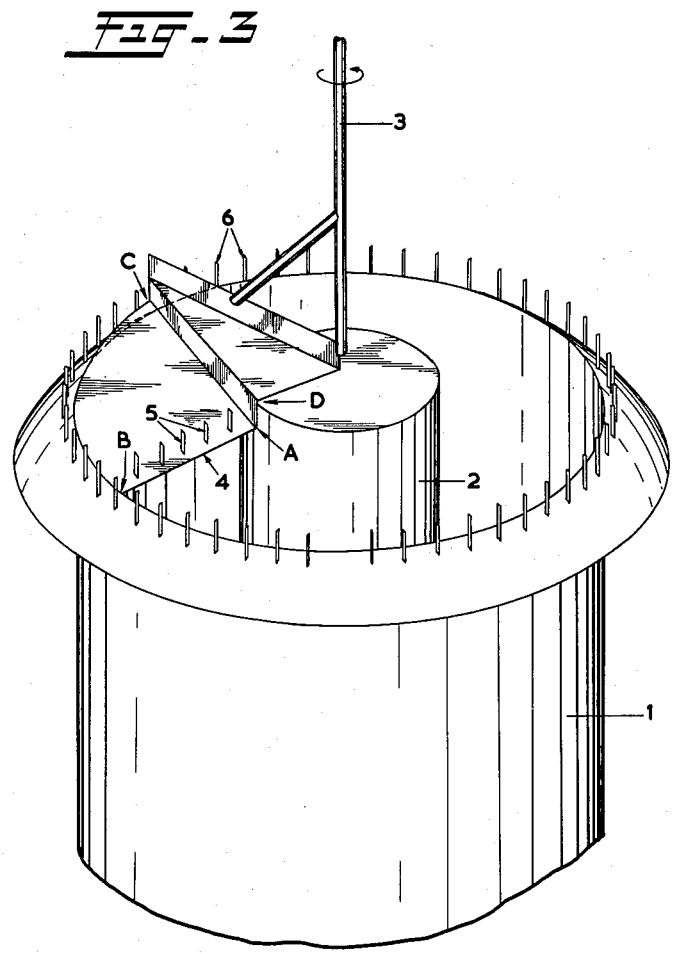

May 5, 1964  L. RADEMA ETAL  3,132,026
PROCESS FOR THE CONTINUOUS MANUFACTURE OF CURD
Filed July 10, 1961  3 Sheets-Sheet 3
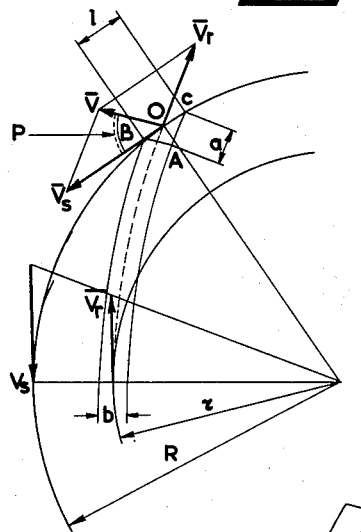
$$\triangle ABC \backsim \triangle VOV_s \text{ (h.h.)}$$
$$\therefore \frac{AC}{BC} = \frac{VV_s}{OV_s} \text{ or: } \frac{a}{l} = \frac{|\vec{V_r}|}{|\vec{V_s}|} = \frac{\tau}{R}$$
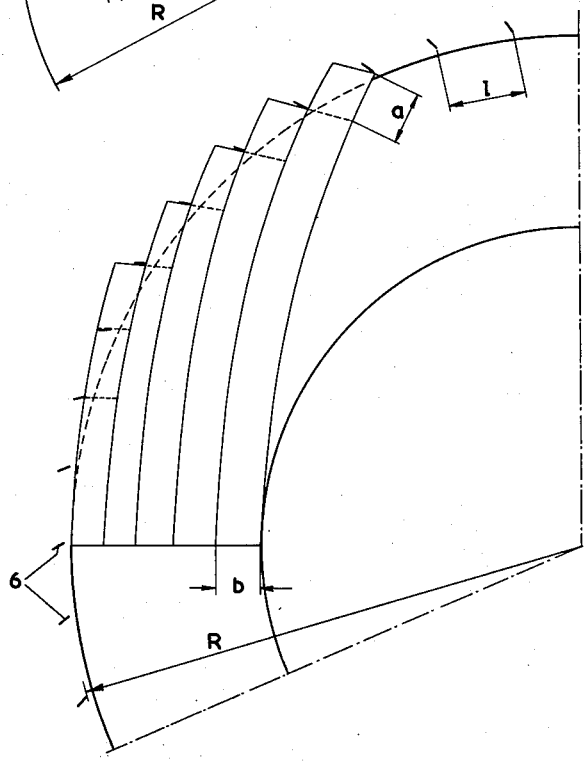
INVENTORS
LAMBERTUS RADEMA
JACOB UBBELS
ADRIAAN G. J. ARENTZEN
BY JOHAN T. VAN DER LINDE
Hammond + Littell
ATTORNEYS 3,132,026
PROCESS FOR THE CONTINUOUS MANUFACTURE OF CURD
Lambertus Radema and Jacob Ubbels, Ede, Adriaan G. J. Arentzen, Amersfoort, and Johan T. van der Linde, Ede, Netherlands, assignors to Nederlands Instituut voor Zuivelonderzoek, Ede, Netherlands, a corporation of Dutch law
Filed July 10, 1961, Ser. No. 122,690
Claims priority, application Netherlands July 11, 1960
4 Claims. (Cl. 99—116)

The invention relates to a process for the continuous manufacture of curd by adding to cooled milk the required quantity of rennet, keeping the mixture for some time in that temperature range, and subsequently heating it.

Recently there has been a tendency to mechanize the manufacture of cheese and to carry it out in a continuous process. A particularly important part of such a process is the production of the curd, especially the cut curd.

One of the difficulties involved is, that the curd becomes available batchwise, while the further apparatus for the manufacture of cheese should preferably operate continuously. As the quantity becoming available cannot be processed rapidly enough, it is difficult to get a homogeneous product in this way. A resolution of this problem might be a reduction of the ratio between the capacity of the cheese tank and the capacity of the said further apparatus for the manufacture of cheese. Another resolution might be to carry out the coagulation process itself continuously. This latter method was suggested in the U.S. patent specification 2,781,269. According to said process the required additions are supplied by means of dosage pumps to a continuously moving casein-containing liquid (such as milk), which has the proper temperature. After thorough mixing, the milk flows through a gradually tapered vertical conduit of which the larger upper end is joined with the lower end of a cylindrical tube. In the tapered conduit the turbulences in the stream of liquid are damped, so that in the cylindrical tube the milk particles have an equal and similarly directed velocity and coagulation may take place without the formation of curd dust and without the occurrence of losses of fat. At the top of the tube the coagulated mass is sufficiently firm to be divided into small, uniform lumps by means of a cutting grid and a rotating knife, and to be subjected to various other treatments.

However, several disadvantages attach to said process, and make it doubtful whether it can be applied in practice.

(1) The tube in which the coagulation takes place must be relatively large to make possible the coagulation, which takes 5–20 minutes.
(2) The mixing operation may take place only for a short time; consequently the homogeneity of the product is not guaranteed.
(3) The method for damping the turbulence takes a lot of time.
(4) The cutting apparatus used has several disadvantages.

The most important disadvantage is caused by the fact that curd will be deposited at the crossings of the wires, a process which is aggravated with the progress of time. It is found that the amount of curd deposited may vary from one place to another, and consequently the coagulated mass no longer passes uniformly through the cutting grid.

According to Nature 149, 194 (1942), the clotting of milk caused by the addition of rennet may be divided into two phases, viz. one enzymic and one non-enzymic. In the enzymic phase casein is converted into paracasein. In the non-enzymic phase the coagulation of the paracasein with calcium takes place. Now the temperature coefficient of the first phase was found to be much smaller than that of the second phase. Owing to this it became possible to study the two phases separately. In fact, if the milk which contains rennet is stored at 0° C., the first phase indeed proceeds more slowly than at the commonly applied coagulation temperatures, but still within a reasonable time. At this low temperature, however, the rate at which the second phase is completed is decreased so much that this milk can still be stored for a long time without curdling. A subsequent increase of the temperature will cause flocculation within a very short time. If 130 minutes after the addition of the rennet the milk is heated from 0° C. to 37° C., its clotting time was 90 seconds. Longer storage of the milk at 0° C. caused only a slight further reduction of the clotting time.

Now, it was found that the difference in temperature coefficient between the two phases may be utilized for the continuous production of curd. According to the invention rennet, starter, and other ingredients required for the production of cheese are added to the milk that has been cooled down to a temperature of —1° C. to +15° C., and after being kept at said temperature for 1½–48 hours, this mixture is passed firstly through a heat exchanger, in which it is heated to 20–45° C., and then through a coagulation chamber, which near the inlet-opening of the feed pipe comprises a device for preventing turbulences in the liquid mass and the outlet opening may be equipped with an apparatus for cutting the curd.

Since during the first phase the consistency of the milk does not change and no flocculation takes place as yet, the milk may still be made to flow, be pumped, or be mixed as desired, without any detrimental consequences. It is thus possible to mix the commonly used additions very thoroughly with the milk, during the whole cold storage period, if desired. This promotes the homogeneity of the product. The mixing process preferably takes place with the exclusion of air. Indeed, large amounts of air may dissolve in cold milk, and this air will be liberated again during the heating process. It may be occluded by the clotting casein and may afterwards cause the curd to float in the whey and may produce air occlusions in the cheese.

The circumstance that the clotting time becomes only slightly shorter if after the completion of the first phase the milk is still stored at the low temperature enables that the heating of the curd does not have to take place immediately after the completion of the first phase. This implies in the first place that if the milk is fed continuously to an apparatus in which the first phase is completed, the time during which the milk remains in said apparatus above a given minimum is not tied down to narrow limits, so that the control of this part of the process presents few difficulties. Secondly this even enables one to carry out the first phase discontinuously in tanks. In that case the temperature of the milk should be adjusted so that after the simple addition and mixing of the commonly used ingredients the end-point of the first phase is indeed reached, but that the clotting time decreases only within a permissible range during the period in which the liquid from the tank is processed further.

The method at which the reaction of the first phase takes place in tanks instead of in a heat exchanger greatly promotes the homogeneity. In this way the dosage of the additions and the temperature-control are simple.

In the heat exchanger the mass is heated to the clotting temperature and subsequently flows into the coagulation chamber, in which, moving slowly, it completes the second phase. The time interval between the beginning of the heating process and the moment at which the milk in the coagulation chamber is moving uniformly with an equal and similarly directed velocity has to be so short that no perceptible clotting occurs during this time interval. Indeed, turbulences of the clotting milk are most undesirable; they give rise to the dreaded curd dust as well as to losses of fats and proteins.

Preferably the process is started with milk having a temperature of 3–6° C., and after addition of the rennet, starter, and the further ingredients the mass is kept at said temperature for another 2–6 hours.

The heat exchanger used may consist of a conduit or tube heated by steam or some other heating medium, but preferably a tubular or a plate heat exchanger is used. The most favourable temperature for the coagulation in the coagulation chamber is 29–30° C.

The cut curd thus obtained may further be converted into cheese.

An apparatus for carrying out the process is shown in FIGS. 1 to 5.

In FIG. 1, 1 denotes a tank in which the milk is stored, the required additions are added, and the substances are thoroughly mixed by stirring. After the required reaction period the mixture is pumped into the lower part of the cylindrical coagulation chamber 4 by means of pump 2 and through heat exchanger 3. At a small distance from the bottom of said coagulation chamber there is a perforated disc 5. The size of the perforations in this disc and their number should be such (fifty 1 mm.-diameter perforations per dm.$^2$, for instance) that beneath this disc a pressure is set up which is large in relation to the friction losses between disc and bottom. By this means it is ensured that the quantity of milk flowing through each of the perforations of the disc is practically equal.

The flow rate of the milk is interrupted by the second disc 6, which contains the same number of perforations, but this time much larger (fifty 10 mm.-diameter perforations per dm.$^2$, for instance). The non-perforated parts of the upper disc are exactly above the perforations of the lower disc. In this way secondary flow in the coagulating milk is prevented. In the upper part of the coagulation chamber the consistency of the coagulated milk is such that it can be cut.

The cutting operation is carried out by means of a knife, being illustrated in FIG. 3. In the centre of the cylindrical coagulation chamber 1 a smaller cylinder 2 is present, the object of which will be described in detail. The upper surface of the inner cylinder 2 lies above the upper edge of the outer cylinder 1. The knife is moved by the rotating shaft 3, whereby the cutting edge 4 of the knife and the vertical blades 5 cut the coagulated milk into strips. The knife is a part of a segment of a circle and has been mounted in such a way that AB forms a small angle with the plane through the upper edge of cylinder 1, so that A lies higher than B. The cutting surface ABC of the rotating knife may remain just inside the wall of the cylinder, but it may also overlap the wall of the cylinder. The circular edge BC of the knife is inclined upwards in a helix in such a way that the underside of the plate ABC remains free of the (continuously rising) surface of the coagulated milk. The strips obtained by means of the cutting edges 4 and 5 slide over plate ABC in a way which is illustrated most clearly in FIG. 5. Thus, they remain intact, but are straightened out. If AB were horizontal (see also FIG. 3), the innermost strip would brush against the wall CAD (the radius of curvature of wall CAD being larger than the curvature of the inner cylinder) and at the same time would have to go up the slope of plate ABC (for C lies higher than A and B). Actually, as already mentioned above, A lies higher than B, so that the slope up which the central strip has to go is smaller. Another object thus attained is that the cut strips will tend to slide off sideways, in consequence of which the pressure of the innermost strip against the wall CAD, among other things, will diminish. At an adequate slope of AB, the innermost strip may even be free from this wall. The firmness of the cut strips also plays a part in this. The less firm the strips, the more readily they tend to slide off sideways with the same position of plate ABC. The position of plate ABC is preferably adjusted in such a way that the strips only just do not slide off sideways. As they arrive at the edge of the outer cylinder the strips are cut up by the vertical blades 6 (see FIGS. 3 and 5). Since all the strips are cut into $n$ pieces with each revolution of the cutting apparatus if there are $n$ blades on the circumference, the volume of a piece from the strip originally lying at a distance $r$ from the centre (see FIG. 4), the width of the strip being $b$ and its height $h$, is equal to $$\frac{2\pi r h b}{n}$$

If care is taken that $rb$ is constant, the volume of all the pieces formed will be equal. The shape of the pieces is mainly determined by the movement of the strips relative to the blades 6.

FIG. 5 shows the position of the blades 6 as well as the shape of the lumps into which the strips are divided. FIGS. 4 and 5 also show the length $a$ of the lumps into which a strip is divided by the blades 6 at intervals of $l$. From the similarity of triangles it follows that $$\frac{a}{l}=\frac{r}{R}$$

The volume of a lump is equal to $abh$ if $h$ is the height of the strip. And since $$abh = br\frac{l}{R}$$

all the lumps obtained have the same volume if $br$ is constant. The distance between the blades 5 is thus inversely proportional to the distance of the blades from the centre. The minimum distance between the blades 6, i.e., between the "outer" blades, is about 0.5 cm. The maximum distance is preferably chosen no greater than 4 cm.

The gradient of AB may in general be between 0° and 60°, but preferably between 5° and 10°, e.g., 7°. The pitch of the curved line BC is determined only by the speed of the cutting apparatus and the rising rate of the coagulated milk. In fact, the underside of the plate ABC should always remain free of the rising surface of the coagulated milk. The shape of the wall CAD may vary widely; in fact, it may curve "forwards," or be plane, or curve "backwards," both vertically and in a diverging direction. If the gradient of AB is sufficient, the wall CAD may even be omitted altogether. In FIG. 3 the cutting edge AB lies in a plane through the shaft of cylinders 1 and 2. This of course is not necessary.

In the construction described above the cut curd is removed outwards. It is, however, also possible to remove the curd inwards, i.e., towards the inner cylinder. A combination of the two methods is of course also possible and presents possibilities especially when the distance between the inner and the outer cylinder is large.

The side AD of the raised part of the knife rotates as close to the inner cylinder 2 as possible. This inner cylinder has been provided in order to prevent the cutting speed of the cutting edges relative to the coagulated curd becoming too slow. Too slow a cutting speed gives rise to all sorts of difficulties, such as curling-up in front of the knife, poor removal from the knife, and the like.

The cut curd obtained in the above way may be warmed a few degrees higher to accelerate the syneresis.

The minimum distance between the cylinders 1 and 2 is 1 to 2 cm., the maximum distance is theoretically unlimited, but in practice will not exceed 100 cm.

The minimum diameter of the inner cylinder 2 is 0 cm., i.e., this cylinder may be omitted, if desired; the maximum diameter is not tied down to any limits, but should always be smaller than the diameter of the outer cylinder 1.

In the above description the reference was invariably to an annular coagulation chamber. Another form may also be used, provided the coagulation process is not adversely affected by it. A slit-shaped coagulation chamber makes it possible to use a reciprocating cutting apparatus, and this is attractive indeed from the point of view of cutting technique.

In general all the blades should be as thin and sharp as possible. The maximum thickness might be put at 5 mm. Blades of 0.5 mm. and sheet steel of 1 mm. for the surface ABC are suitable in practice.

*Example I*

In a tank, pasteurized milk was stored at a temperature of 3° C. To this milk the following ingredients were added: 6‰ (by volume) of starter, 0.3‰ (by vol.) of rennet, 0.3‰ (by vol.) of $CaCl_2$, 0.2‰ (by weight) of $KNO_3$.

Five hours after the addition of rennet and starter, the milk was begun to be pumped from the tank and to be forced through a plate-heat exchanger to the coagulation chamber. The milk was heated to 30° C. in the heat exchanger. Within 14 minutes after the temperature of 30° C. had been reached the milk had risen to the top of the coagulation chamber (height more than 1 m.), where it had a consistency such that it could be cut. The curd particles thus formed were regularly shaped and were converted into cheese.

*Example II*

The treatment of the milk in the storage tank was the same as in Example I. In the heat exchanger the milk was now heated to 32° C. instead of 30° C. At this coagulation temperature the milk after 6 minutes already had a consistency such that it could be cut and converted into cheese. In this case the height of the coagulation chamber could be less than e.g., 1 m., and amounted to about 0.5 m.

*Example III*

In a tank, pasteurized whole milk was stored at a temperature of 3° C. The same ingredients as in Example I were added to this milk.

After the rennet and the starter had acted on the milk for 36 hours, the milk was begun to be pumped from the tank and to be forced through the plate heat exchanger to the coagulation chamber. The milk was heated in the heat exchanger to 29–30° C. Within 14 minutes after the coagulation temperature had been reached the milk rose to the top of the coagulation chamber (height more than 1 m.), where it could be cut. The cut curd was converted into cheese.

What we claim is:

1. A process for the continuous manufacture of cheese curd which comprises adding rennet and starter to milk cooled to a temperature of about −1° to about 15° C., maintaining the resulting milk mixture at said temperatures for about 1.5 to 48 hours to convert casein into paracasein, rapidly heating the mixture to about 20° to 45° C. without perceptible clotting, coagulating the heated mixture in a coagulation chamber without turbulence to form curd and cutting the curd to effect exudation of the whey.

2. The process of claim 1 wherein the milk mixture is maintained at a temperature of about 3 to 6° C. for two to six hours.

3. The process of claim 1 wherein the milk mixture is rapidly heated to 29° to 32° C.

4. The process of claim 1 wherein the milk mixture is rapidly heated with a heat exchanger selected from the group consisting of a plate heat exchanger and a tubular heat exchanger.

References Cited in the file of this patent

UNITED STATES PATENTS

| | | |
|---|---|---|
| 2,712,999 | Strezynski | July 12, 1955 |
| 2,851,363 | Kielsmeier | Sept. 9, 1958 |
| 2,917,827 | Lankford | Dec. 22, 1959 |
| 2,997,395 | Berridge | Aug. 22, 1961 |